(No Model.) 2 Sheets—Sheet 1.
E. C. KETCHUM.
PROCESS OF TREATING ORES.
No. 592,055. Patented Oct. 19, 1897.
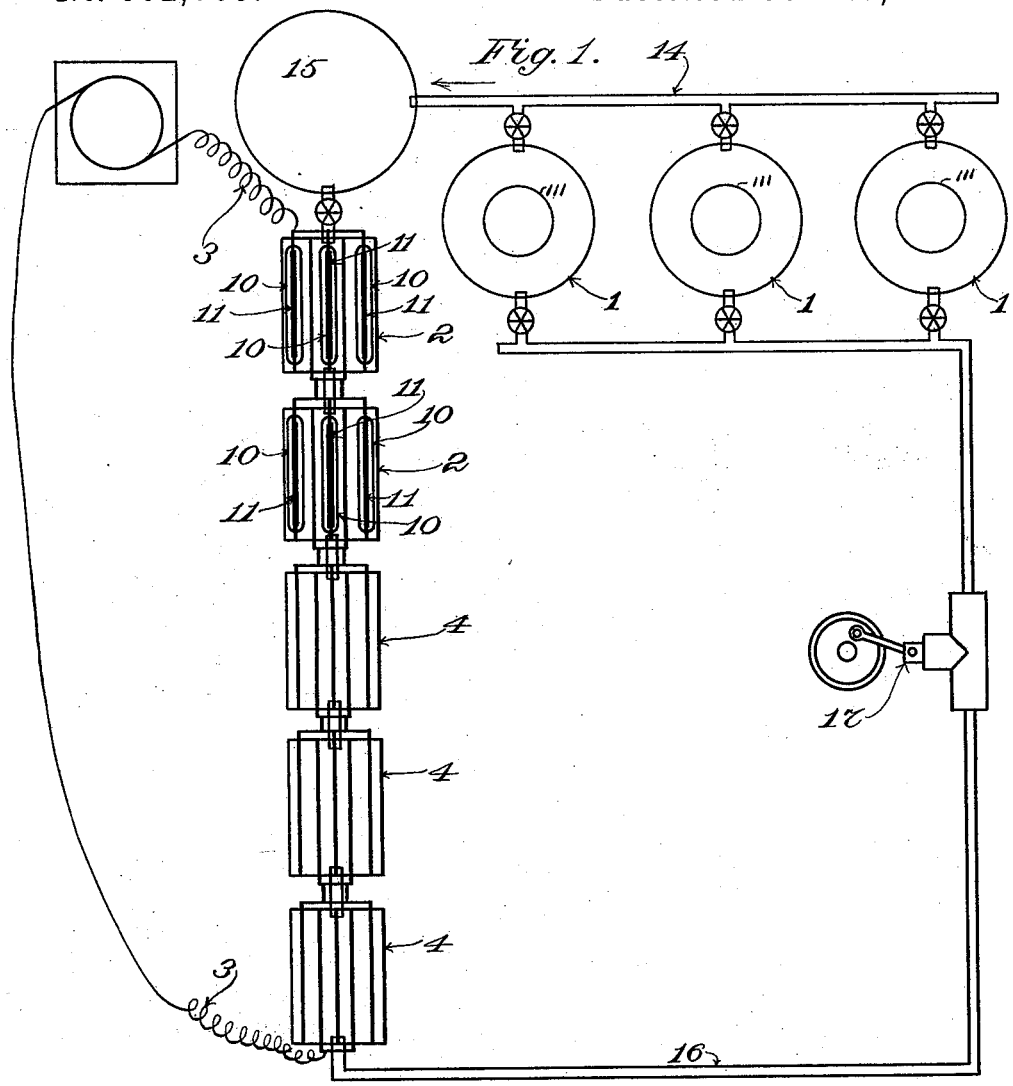
Witnesses.
Oscar F. Hill.
Alice H. Morrison.
Inventor:
Ernest C. Ketchum
by Macleod Calver & Randall
Attorneys.

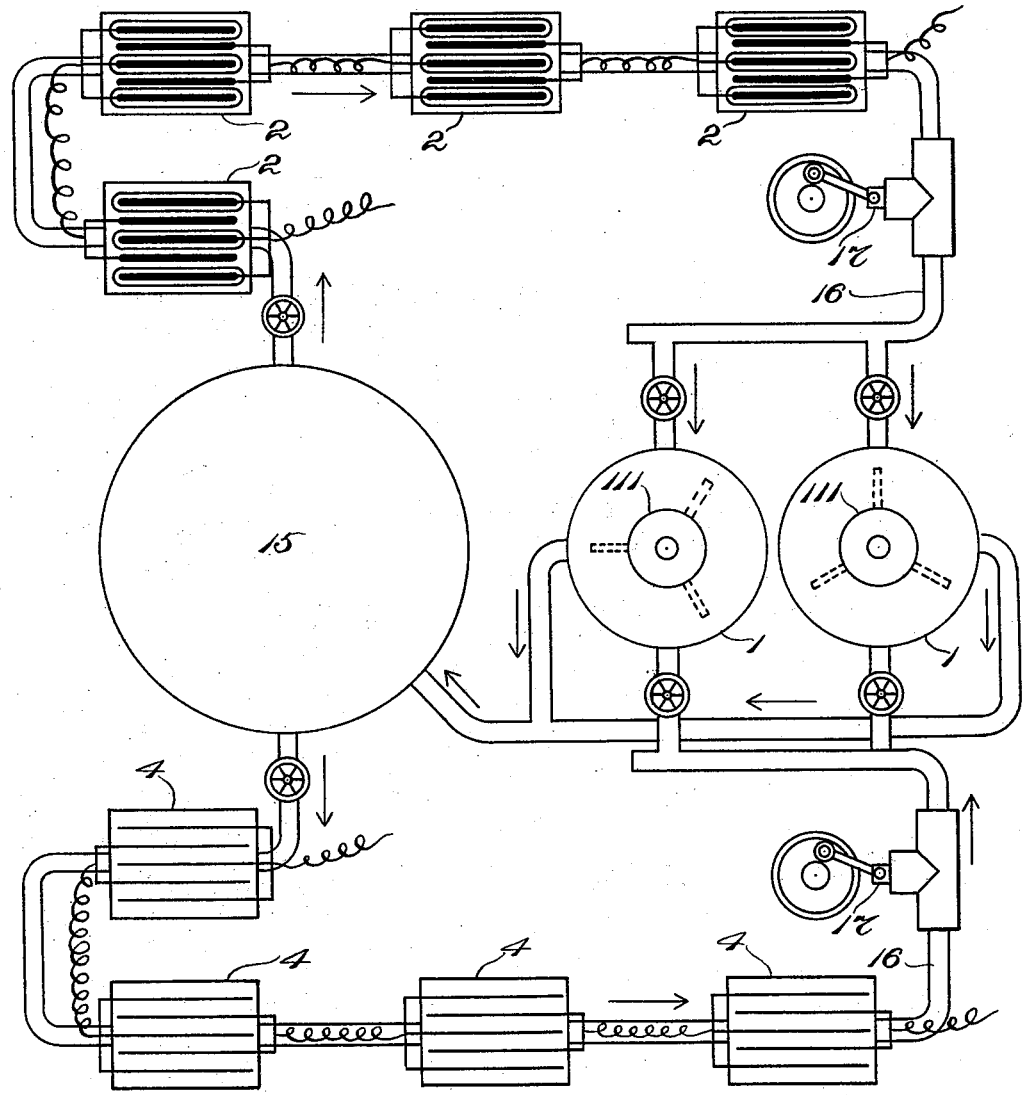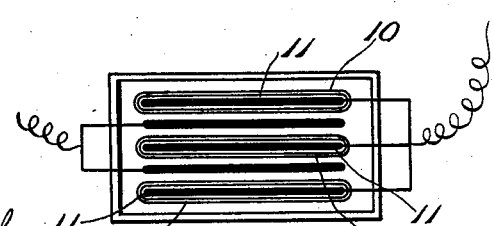

UNITED STATES PATENT OFFICE.

ERNEST C. KETCHUM, OF BOSTON, MASSACHUSETTS.

PROCESS OF TREATING ORES.

SPECIFICATION forming part of Letters Patent No. 592,055, dated October 19, 1897.

Application filed November 21, 1896. Serial No. 612,942. (No specimens.)

*To all whom it may concern:*

Be it known that I, ERNEST C. KETCHUM, a citizen of the United States, residing at Boston, in the county of Suffolk and State of Massachusetts, have invented certain new and useful Improvements in Processes of Treating Ores, of which the following is a specification, reference being had therein to the accompanying drawings.

My invention has for its object to provide an improved process by means of which the metals which are contained in mixed sulfid ores may be extracted commercially at a lower cost than by any other means or process known to me.

My invention is fully set forth in the following description, and the novel features thereof are pointed out and clearly defined in the claims at the end of this specification.

For the purpose of more clearly setting forth my improved process I have made reference in the following description to the accompanying drawings, in which—

At Figure 1 I have shown a diagram illustrative of the apparatus by means of which my process is practiced. Fig. 2 is a detail hereinafter referred to. Fig. 3 is a diagrammatic view showing a modified arrangement of the apparatus shown in Fig. 1, reference to which will hereinafter be made.

In practicing my process I first break the ore into fine particles by means of a crushing-mill or similar device. The ore is then concentrated in any well-known manner, if concentration is necessary. I then subject the ores that have been thus crushed to heat in a reverberatory or other roasting furnace of any well-known construction. In the roasting process which goes on in the furnace it is important that as nearly as possible what is known as a "dead-roast" should be obtained. In the roasting process the sulfids are changed to oxids, practically all the sulfur being driven off in the form of sulfur dioxid, which is saved in the well-known manner, and which is particularly fitted for the manufacture of sulfuric acid. After the ore has been roasted, a fraction of a per cent. of sulfur will remain in the form of sulfate of zinc and another fraction in the form of undecomposed sulfid of zinc. I then preferably leach the roasted ores with water, which serves to remove the slight trace of sulfate of zinc. This step is, however, not absolutely necessary to the successful practicing of my process. I then place the ore which has been thus treated in vats, (indicated at 1 in the accompanying drawings,) containing mechanical agitators, (indicated at 111,) which may be of any well-known construction, and subject it to the action of a dissolving fluid containing caustic alkali in solution. This solution contains, preferably, about twenty-five per cent. of alkali, but the precise percentage may be varied somewhat. While the ore is in the said solution in the dissolving-vats, the solution is kept at about 210° Fahrenheit—that is, the temperature is kept as high as possible without boiling the solution. The effect of this solution on the ore is to dissolve both the lead and the zinc contained therein, forming from the lead and zinc what may be described as "plumbate of potash" and "zincate of potash"—that is to say, if potash be employed as the caustic, or corresponding soda salt if soda is used. These terms, however, are, in my opinion, somewhat misleading, since the lead and zinc may be regarded as being present in the solution of caustic alkali in the form of oxid of lead and oxid of zinc. If there is iron in the ore, it remains as ferric oxid in the residue or tailings. The silver will also remain in the tailings, generally as metallic silver, and the copper will remain as cupric oxid. All other metals will also remain in the tailings with the iron and silver, and may be recovered by subjecting the tailings to treatment in any well-known manner for the recovery of these metals. The solution of caustic alkali which contains, as above stated, oxid of lead and oxid of zinc is then caused to flow through pipes 14 into a series of tanks or vats, (indicated at 2 and 4 in the accompanying drawings,) which are preferably of iron and are connected by means of glass or earthenware tubing or equivalent non-corrosive insulating material. Each of said tanks contains sets of anodes and cathodes which may be of well-known construction and which are in the circuit of an electric current, the conducting-wires being shown at 3. The first tanks (indicated at 2) of the series of tanks are the tanks in which the lead oxid contained in the solution will be decomposed by the electric current, the decomposition resulting in the production of caustic potash or soda and metallic lead, the latter being in the form of crystals or spongy masses which are deposited on the cathode side, while oxygen is freed at the anode. The oxygen thus freed may be saved as a by-product, if desired. The electromotive force to which the solution in these tanks (indicated at 2) is subjected is substantially about one and eight-tenths volts. This current will decompose the lead oxid, but will not affect the zinc oxid, which requires a current of a higher electromotive force—namely, about two and one-tenth volts.

The lead, which is deposited on the lead cathodes in the form of small crystals or spongy masses, as above stated, is raked off at intervals and subjected to pressure in a hydraulic press or the like, and is thus condensed and formed into small pigs.

To insure satisfactory results, I employ a cup (shown at 10) which is preferably made from asbestos cloth or earthenware. An anode 11 of carbon or platinum may be employed, the said anode being placed in the said cup. Inside the cup I place a solution of pure caustic—that is, a caustic solution free from lead or the like. The anode 11 is immersed in this pure-caustic solution, and outside the cup 10 within the cell is the caustic solution which contains the lead and zinc, as above stated. By this arrangement I prevent the formation of a peroxid of lead at the anode, and this is undesirable for the efficient working of my process.

The caustic solution containing the zinc oxid which, as above stated, will not be affected by the electric current in the lead-tanks, indicated at 2, flows on into the tanks indicated at 4, it being understood that the tanks are so arranged with reference to each other that the liquid will pass by gravity from one tank to the adjacent one. In the tanks indicated at 4 a current is applied having a higher electromotive force—namely, about two and one-tenth volts—and this effects a decomposition of the zinc oxid, metallic zinc being deposited on the zinc cathode in a hard mass. The zinc cathode thus covered may be melted up and formed into pigs of zinc. After a zinc cathode is thus covered with a deposit of metallic zinc a small piece thereof may be taken and rolled out into a thin sheet to form a new cathode to replace the one removed. The anodes employed in all the tanks are of insoluble conducting material, such as carbon or platinum. As previously stated, however, I do not confine myself to the use of any specific electrical apparatus, since apparatus of well-known construction may be employed. After the oxids of lead and zinc have thus been decomposed and removed the caustic solution may be returned into the dissolving-tank to be used over again. After frequent use the caustic solution becomes impaired, probably by reason of its slow conversion into carbonate through carbon dioxid in the atmosphere. The solution which is thus impaired is useless for this purpose to the extent of the presence of the carbonate. Since also there may be a slight amount of silica present in the ores, there is apt to be a slow formation of silicate of soda, which impairs the value of the caustic solution in the same manner as does the presence of carbonate. A caustic solution when impaired by the presence of carbonate and silicate may be restored by boiling with caustic lime. It is therefore not a difficult matter to restore the impaired caustic solution.

The decomposition by electrolytic action is carried on in the presence of heat in all cases. It is therefore desirable that all the tanks in the system should be kept heated to over 200°. Any well-known arrangement for applying heat may be employed.

In practicing my process it is not essential that the caustic solution should, after the lead has been removed, pass directly from the last of the series of lead-tanks 2 to the first of the series of zinc-tanks 4, since the lead-tanks and zinc-tanks may be arranged in independent groups, as is indicated in the diagrammatic view shown in Fig. 3. In an apparatus having this latter arrangement, after the lead has been removed, which in all cases must precede the removal of the zinc, the caustic solution containing the zinc alone will be returned to the dissolving tank or tanks, (indicated at 1,) from which it passes again into the receiving-vat 15 and thence is permitted to flow through the zinc-tanks 4, where the zinc is removed. The direction of flow of the solution is indicated by the arrows in said Fig. 3, and at 17 17 in said figure are indicated pumps, which may be employed to cause a flow of the said caustic solution. At 111 are indicated mechanical agitators, which are located within the dissolving-vats and which may be of any well-known construction. I preferably employ agitators which comprise a vertical shaft 112, provided with means for causing rotation thereof, said shaft being provided with horizontally-projecting arms or paddles 113, by means of which the contents of the vat may be stirred up or mechanically agitated.

In Fig. 1 the pipes 14 lead from vats 1 to a receiving-vat 15, from which the solution passes into the tanks 2 and 4. The pipe 16 leads from the last tank 4 to the vats 1, a pump 17 being employed to occasion a flow of the liquid.

What I claim is—

1. The process of treating mixed sulfid ores containing lead and zinc, which consists in first roasting the ores, then subjecting the roasted ores to the action of a solution of caustic alkali in the presence of heat to remove from the ores the lead and zinc, then subjecting the caustic solution containing the lead and zinc to electrolytic action in the presence of heat to remove the lead, in a cell or cells in which the anode is immersed in a solution that is free from lead and that also is separated by a porous medium from the electrolyte containing the lead and zinc, and finally subjecting the solution in which the zinc remains to electrolytic action, also in the presence of heat, to remove the zinc, employing electric currents of different electromotive force in effecting the successive decompositions, as set forth.

2. The process of treating mixed sulfid ores containing lead and zinc, which consists in first roasting the ores, then subjecting the roasted ores to the action of a solution of caustic alkali in the presence of heat to remove from the ores the lead and the zinc, then subjecting the caustic solution containing the lead and zinc to electrolytic action in one or more cells to remove the lead, the anodes of which cells are immersed in a volume of pure caustic solution which is separated by a porous medium from the electrolyte containing the lead and zinc, and then subjecting the caustic solution or electrolyte containing the zinc only to electrolytic action in one or more cells to remove the zinc, substantially as set forth.

In testimony whereof I affix my signature in presence of two witnesses.

ERNEST C. KETCHUM.

Witnesses:
ALICE H. MORRISON,
WILLIAM A. COPELAND.